H. & A. GREENLEAF.
APPARATUS FOR TESTING STEAM PRESSURE.
No. 181,669. Patented Aug. 29, 1876.
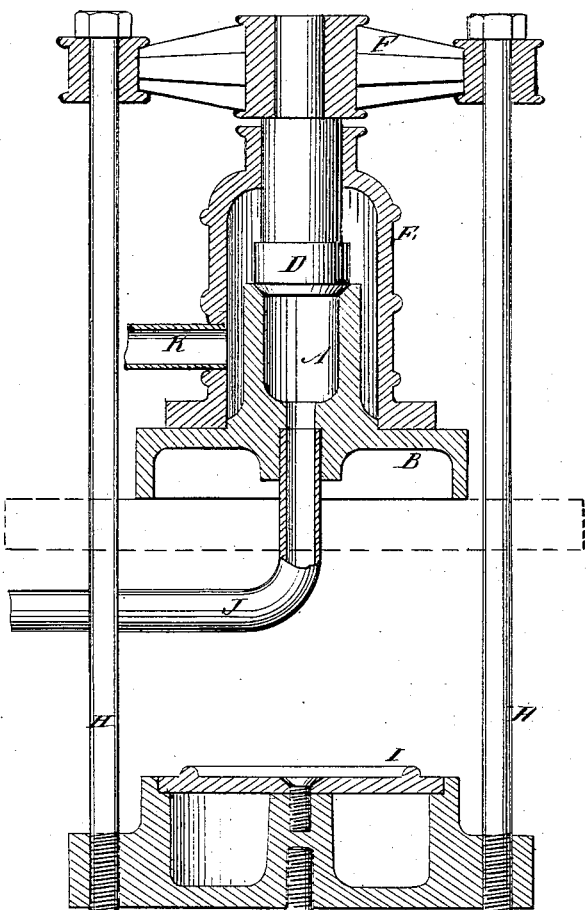
Fig. 1
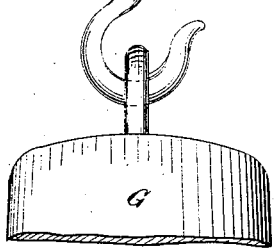
Fig. 2
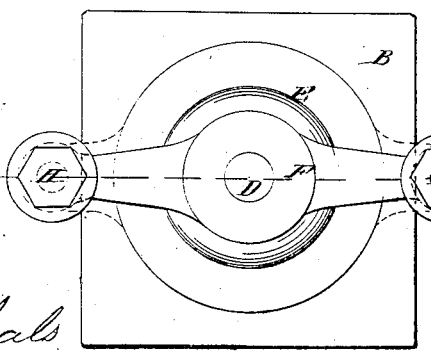
WITNESSES:
C. Neveux
John Goethals
INVENTOR:
H. Greenleaf
A. Greenleaf
BY
ATTORNEYS.

UNITED STATES PATENT OFFICE.

HOWARD GREENLEAF AND ALFRED GREENLEAF, OF BROOKLYN, N. Y.

IMPROVEMENT IN APPARATUS FOR TESTING STEAM-PRESSURE.

Specification forming part of Letters Patent No. 181,669, dated August 29, 1876; application filed June 6, 1876.

*To all whom it may concern:*

Be it known that we, HOWARD GREENLEAF and ALFRED GREENLEAF, of Brooklyn, in the county of Kings and State of New York, have invented a new and Improved Apparatus for Testing Steam-Pressure, of which the following is a specification:

The invention consists of a simple contrivance of devices by which the pressure of steam on an area of any given size—say, a square inch—may be weighed by means of weights lifted directly by the steam without a lever or spring.

Figure 1 is a sectional elevation of our improved tester, taken on the line $x\ x$ of Fig. 2. Fig. 2 is a top view.

Similar letters of reference indicate corresponding parts.

A is a hollow cylinder, setting upright on a base, B, adapted to rest on a shelf, bracket, or table, C, and being open at the top, on which a valve, D, of (preferably) one square inch in diameter, is seated. The rod of the valve works without friction through the top of a case or jacket, E, surrounding the cylinder, and has the cross-beam F attached to its upper end. The weight G, for weighing the steam-pressure, is suspended from this beam by the rods H, and a holder, I, for weights to be added when required, the rods passing through the table C, for a guide and support against lateral movement.

Steam enters the cylinder A under the valve by the pipe J, and the exhaust passes off through pipe K.

The apparatus is intended as a permanent fixture in a boiler-room, and is a positive and comprehensive instrument, readily at hand to test the accuracy of the steam-gage and working condition of safety-valve, whether the engine is running or not, without the necessity of disconnecting steam-fittings, or mathematical calculations necessary when the safety-valve is employed for testing. It is constructed so that the steam acts directly upon the weights, free from levers or springs, the action being a direct dead lift of the exact counter-balance of the pressure upon the valve. The weights being hung directly under the valve, the valve will seat in its proper place without the necessity of the valve-stem fitting tightly in the guides. No packing is required, and the friction is reduced to the minimum.

By the use of this instrument, parties in charge, or proprietors of steam-boilers who may have the least possible idea of mechanics, have a ready means within their understanding to satisfactorily inform themselves whether their indicators record correctly, and by frequent test explosions of steam-boilers may be avoided.

For want of such a device, engineers generally depend upon their steam-gages, the accuracy of which is doubtful, as in many cases they are seldom or never tested, and thus run great risks that may be avoided by this instrument.

In case of testing boilers by hydrostatics, this instrument may be used to any given pressure by simply adding weights up to the required amount.

Having thus described our invention, we claim as new and desire to secure by Letters Patent—

The combination of upright cylinder A, having valve D seated in the top, and the inlet-pipe J below the top, case E, beam F, rods H, weight-holder I, and weight G, substantially as specified.

HOWARD GREENLEAF.
ALFRED GREENLEAF.

Witnesses:
   T. B. MOSHER,
   ALEX. F. ROBERTS.